United States Patent [19]
Chapelle

[11] Patent Number: 5,411,071
[45] Date of Patent: May 2, 1995

[54] RADIAL TIRE HAVING CROWN REINFORCEMENT FORMED OF PLIES OF DIFFERENT RESISTANCE

[75] Inventor: Michel Chapelle, Riom, France

[73] Assignee: Compagnie Generale Des Etablisse-Michelin-Michelin & Cie, Cedex, France

[21] Appl. No.: 984,676

[22] Filed: Dec. 2, 1992

[30] Foreign Application Priority Data
Dec. 4, 1991 [FR] France ................. 91 15119

[51] Int. Cl.$^6$ ............ B60C 9/18; B60C 9/20
[52] U.S. Cl. .................. 152/527; 152/526; 152/534; 152/535
[58] Field of Search ............ 152/526–527, 152/534–535, 532, 451

[56] References Cited

U.S. PATENT DOCUMENTS

| | | | |
|---|---|---|---|
| 4,262,726 | 4/1981 | Welter | 152/534 X |
| 4,282,918 | 8/1981 | Tomoda et al. | 152/532 X |
| 4,310,043 | 1/1982 | Inoue | 152/527 |
| 4,526,217 | 2/1985 | Maeda et al. | |
| 4,742,858 | 10/1988 | Takahira | |
| 5,024,261 | 6/1991 | Igarashi et al. | 152/451 X |
| 5,027,877 | 2/1991 | Tamura et al. | |
| 5,061,557 | 10/1991 | Kot et al. | 152/527 X |
| 5,188,685 | 2/1993 | Cherveny et al. | 152/527 X |

FOREIGN PATENT DOCUMENTS

| | | |
|---|---|---|
| 58-27122 | 6/1983 | Japan ................ 152/534 |
| 1193411 | 3/1970 | United Kingdom . |
| 2072590 | 7/1981 | United Kingdom . |
| 659419 | 4/1979 | U.S.S.R. ............ 152/526 |

OTHER PUBLICATIONS

Patent Abstracts of Japan, vol. 1. No. 38 (M-358) 1761) 10 Feb. 1985 & JP-A-59 179 405 (Sumitomo Gomu Kogyo K.K.) 12 Oct. 1984.

*Primary Examiner*—Adrienne Johnstone
*Attorney, Agent, or Firm*—Brumbaugh, Graves, Donohue & Raymond

[57] ABSTRACT

In order to improve the resistance of a crown reinforcement (20) of a radial tire to perforations, cuts and the drawbacks resulting therefrom, the crown reinforcement (20) is formed of three plies (21, 22, 23) of non-stretchable metal wires or cables. The resistances $R_1$, $R_2$, $R_3$ of these plies being such that $$1.5 \leq R_1/R_2 \leq 2.5$$

and $$0.5 \leq R_3/R_2 \leq 1.5,$$

the two radially outer plies (22, 23) having wires or cables separated by a distance (e) equal to at least their diameter.

4 Claims, 1 Drawing Sheet

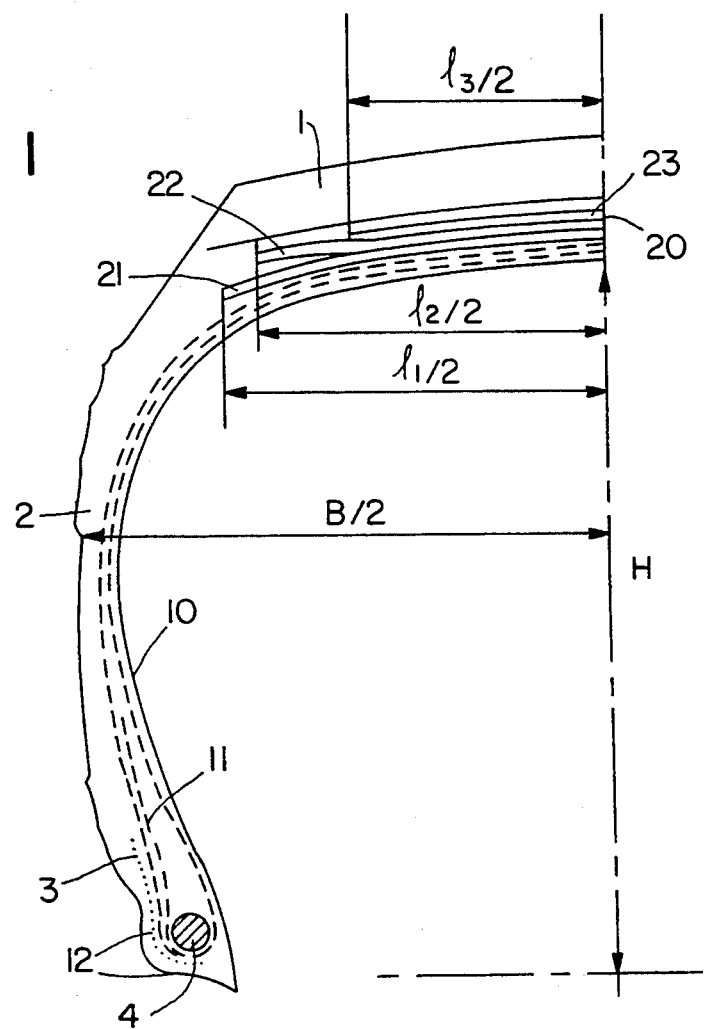
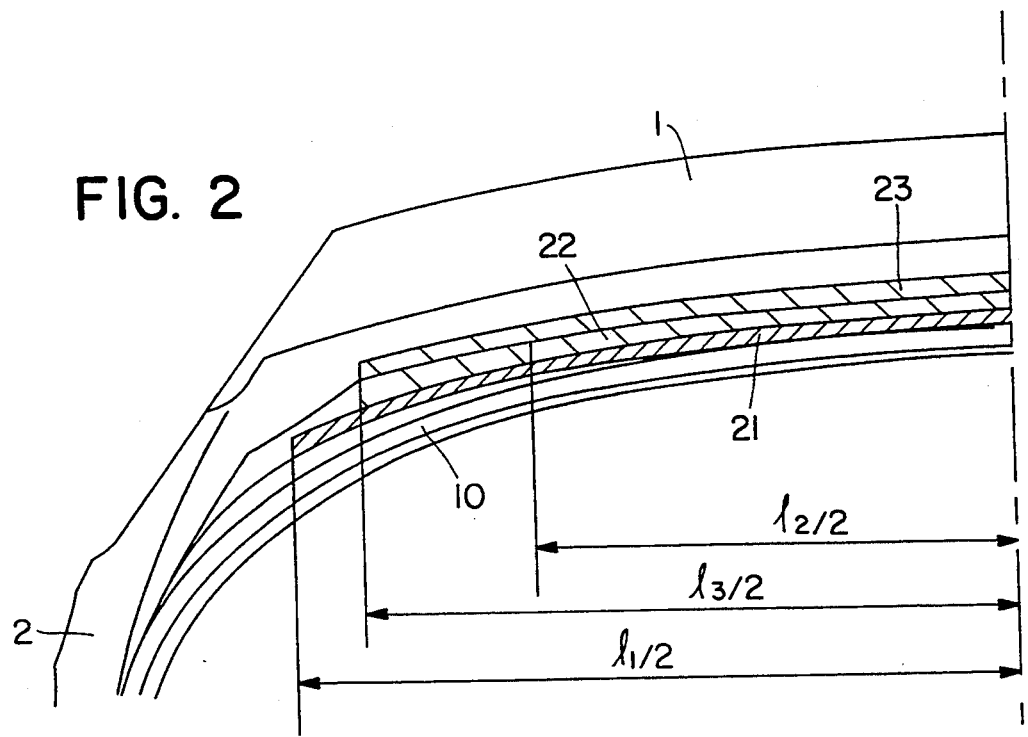

RADIAL TIRE HAVING CROWN REINFORCEMENT FORMED OF PLIES OF DIFFERENT RESISTANCE

BACKGROUND OF THE INVENTION

The present invention relates to a tire of the type having a radial carcass reinforcement intended, in particular, for medium tonnage vehicles, such as light utility vehicles or so-called 4×4 vehicles. More particularly, it concerns the crown reinforcement of such a tire.

The crown reinforcement is generally formed of two plies of substantially inextensible cables which are parallel to each other within a ply and crossed from one ply to the next, forming identical or different angles of between 10° and 45° with the circumferential direction. The cables used are generally metallic and of steel, and such plies are known as "working" plies.

The tire of the type in question is subjected to different conditions of travel; in particular, it is called upon to travel on ground on which there are stones and obstacles of all kinds which may cut it. The tire and, more particularly, its crown reinforcement is then subject to perforations and cuts of cables with possible penetration of water which causes oxidation of the cables and/or a separation between cables of the same ply or between cables of two plies of the reinforcement.

The improvement in the resistance of a crown reinforcement to such injuries is, as is generally known, obtained by the addition, radially on the outside of the said two working plies, of a third ply of elastic metal cables, known as a protective ply. This solution has the major drawback of being expensive while not giving the best performance.

SUMMARY OF THE INVENTION

The present invention proposes a different solution which consists, in its general principle, of distributing the metal of the crown reinforcement differently. In accordance with the invention, a radial carcass reinforcement tire for rough terrain having a crown reinforcement formed of at least three plies of substantially extensible metal wires or cables which form angles $\pm \alpha$ with the circumferential direction of between 10° and 45° is characterized by the fact that the resistances, per centimeter of width, $R_1$, $R_2$, $R_3$ of the radially inner crown reinforcement ply, the intermediate ply and the radially outer ply, respectively, are such that $$1.5 \leq R_1/R_2 \leq 2.5$$

and $$0.5 \leq R_3/R_2 \leq 1.5,$$

the intermediate ply and the radially outer ply of wires or cables being formed such that, in each ply, the axial distance e between two adjacent wires or cables is at least equal to the diameter of the wires or cables.

In referring to the wires or cables forming angles of $\pm \alpha$ with the circumferential direction, the $+$ sign is assigned to the direction of the angle of the wires or cables of the inner ply above the carcass and the $-$ sign is assigned to the direction of the angle of the oppositely biased wires or cables of the intermediate ply above the inner ply.

By substantially inextensible wires or cables there are to be understood wires or cables which have a relative elongation of at most 0.2% under a force equal to 10% of their breaking load.

The resistance per centimeter of width of a ply is the breaking load of each wire or cable multiplied by the number of wires or cables per centimeter of width in the ply measured perpendicular to the direction of the wires or cables.

The distance e between two adjacent wires or cables of a ply is measured, on the one hand, between the two generatrices of the cables or wires, assimilated to cylinders, facing each other in the plane of the ply and, on the other hand, perpendicular to such generatrices.

It is obvious that the resistances per centimeter of the crown reinforcement plies, in addition to satisfying the relationships claimed, are selected as a function of various factors, namely the inflation pressure, the angle made by the wires or cables with the circumferential direction, the geometrical data of the tire, and the safety coefficients which make it possible to take into account static and dynamic overloads suffered by the tire.

While it is possible for the wires or cables of the radially inner ply, intermediate ply and radially outer ply to be crossed from one ply to the next, that is to say with an angular coefficient $+\alpha, -\alpha, +\alpha$, it is advantageous for the wires or cables of the radially outer ply to have the same direction of inclination as the wires or cables of the intermediate ply, that is to say, with an angular configuration $+\alpha, -\alpha, -\alpha$. This preferential arrangement permits a longer life of the crown reinforcement with respect to separations between plies of the reinforcement.

In order to minimize the separations between axial ends of the different plies, it is advantageous for the radially inner ply to be the widest axially and for the radially outer ply to have a width greater than the width of the intermediate ply.

The results relative to the inter-ply separation as a result of cutting/oxidation will be further improved if, when the crown reinforcement is formed of at least three plies of substantially inextensible metal cables, the structure of the cables of the radially outer ply and of the intermediate ply is different from the structure of the cables of the radially inner ply. The cables of the plies of resistances $R_2$ and $R_3$ will be so-called "open" or "aerated" cables, that is to say, cables having a structure which permits the introduction of the lining rubber inside the cables, while the cables of the ply of resistance $R_1$ will be so-called "closed" cables having a structure which does not permit said introduction of rubber.

DESCRIPTION OF THE DRAWINGS

The invention will be better described and better understood with the aid of the description of the non-limitative embodiments shown in the accompanying drawings, in which:

FIG. 1 is a radial section through a tire in accordance with the invention having a carcass reinforcement and a crown reinforcement with three working plies of steel;

FIG. 2 is a radial section through a preferred variant with respect to the widths of the plies of the crown reinforcement.

DESCRIPTION OF PREFERRED EMBODIMENTS

The figures concern a 185.80-R-14 XC tire of radial carcass type for vehicles of medium tonnage, known generally as utility vehicles. The same reference numbers designate the same component elements in FIGS. 1 and 2.

The tire of the invention comprises a tread 1, side walls 2 which terminate in beads 3, each of which is provided with a bead ring of "braided" type 4. The carcass reinforcement 10 is formed of two plies of textile cables arranged in radial planes (only the center axes of these plies being shown). One of these plies is wound around the bead rings 4 and extends from one bead 3 to the other. This ply is extended, after winding around the bead rings, by two upturns 11, the ends of which are located at a distance from the seat of the bead equal to between one-fourth and one-half of the height H on the rim of the tire, this height being the radial distance between the seat of the bead and the point of the carcass reinforcement furthest radially from the axis of rotation of the tire.

The second carcass ply 10, which is superposed radially on the first, is not wound around the bead rings 4, but its edges adjoin the upturns 11 of the first carcass ply 10. The beads 3 are furthermore reinforced by stiffeners 12 of metal cables.

The crown reinforcement 20 is formed of three plies known as working plies: a radially inner ply 21 which is closest to the carcass reinforcement 10, an intermediate ply 22, and a radially outer ply 23. The steel cables of the ply 21 are inclined with respect to the circumferential direction of the tire by an angle $\alpha$ equal to 22° to the right. The steel cables of the ply 22 are inclined by the same angle $\alpha$, but symmetrically with respect to the cables of the ply 21. The cables of the ply 23 are inclined by the angle $\alpha$ parallel to the cables of the ply 22, namely an overall configuration of +22°, −22°, 22°.

The three plies 21, 22 and 23 have widths $l_1$, $l_2$, $l_3$ equal to 140 mm, 120 mm and 110 mm, respectively.

The description of the tire of the invention will be supplemented by the data of Table I which follows, as compared with a tire of customary manufacture having two identical crown reinforcement plies. Since the resistances of the plies 22 and 23 are the same in Table I, in this example $R_3/R_2 = 1$.

TABLE I

|  | Tire of the Invention | Ordinary Tire |
|---|---|---|
| Number of plies | 3 | 2 |
| Cables ply 21 |  |  |
| Unit wire diameter mm | 0.28 | 0.23 |
| Number of wires/strand | 9 | 9 |
| Number of strands | 1 | 1 |
|  | without hoop | with hoop |
| Breaking load of a cable, daN | 144 | 98 |
| Number of cables per dm | 36 | 50 |
| Resistance, daN | 5184 | 4900 |
| Cables plies 22 and 23 |  |  |
| Unit wire diameter mm | 0.23 | identical to |
| Number of wires/strand | 2 | the cables |
| Number of strands | 3 | of ply 21 |
|  | without hoop |  |
| Breaking load of a cable, daN | 65 |  |
| Number of cables per dm | 41 |  |
| Resistance per dm, daN | 2665 |  |

FIG. 2 shows simply the crown reinforcement of a tire according to the invention with a variant in the widths of the plies of said reinforcement: The ply 22 has a width $l_2$ of 110 mm, less than the width $l_3$ of the ply 23 of 120 mm, the two widths $l_2$ and $l_3$ being less than the width $l_1$ of the ply 21, which is equal to 140 mm.

The tire is otherwise identical in all respects, other than the ply widths, to the tire described previously.

In travel on a road over which stones of suitable size having sharp cutting edges were scattered and the tire tested being wetted by passage through a basin of salt water, the tire of the invention, shown in FIG. 2, exhibited good behavior, more specifically, a mileage life before complete separation due to cuts and oxidation suffered by the cables of the crown reinforcement of greater by about 50% than the average mileage life of tires of current manufacture (11,000 km as compared with 7,500 km).

I claim:

1. A rough terrain tire with radial carcass reinforcement (10) surmounted by a crown reinforcement (20) consisting of three plies (21, 22, 23) of substantially inextensible metal wires or cables forming angles $\pm \alpha$ of between 10° and 45° with the circumferential direction, characterized by the fact that the resistances, per centimeter of width, $R_1$, $R_2$, $R_3$ of the radially inner crown reinforcement ply (21), of the intermediate ply (22), and of the radially outer ply (23), respectively, are such that $1.5 < R_1/R_2 < 2.5$ and $0.5 < R_3/R_2 \leq 1$, the intermediate ply (22) and the radially outer ply (23) being formed of wires or cables such that, in each ply, the axial distance (e) between two adjacent wires or cables is at least equal to the diameter of the wires or cables wherein the resistance per centimeter of width of a ply is defined as the breaking load of each wire or cable multiplied by the number of wires or cables per centimeter of width in the ply measured perpendicular to the direction of the wires or cables.

2. A tire according to claim 1, characterized by the fact that the inner, intermediate and outer plies (21, 22, 23) of crown reinforcement (20), respectively, have different angular configurations $+\alpha$, $-\alpha$, $-\alpha$.

3. A tire according to claim 1, characterized by the fact that the axial widths $l_1$, $l_2$, $l_3$ of the inner, intermediate and outer plies, respectively, of the crown reinforcement (20) are such that $l_1 > l_3$, $> l_2$.

4. A tire according to claim 1, characterized by the fact that the substantially inextensible metal wires or cables are cables in which the cables of the ply (21) closest to the radial carcass reinforcement (10) have a closed structure and the cables of the intermediate ply (22) and of the radially outer play (23) are identical and have an open structure.

* * * * *

UNITED STATES PATENT AND TRADEMARK OFFICE
CERTIFICATE OF CORRECTION

PATENT NO. : 5,411,071
DATED : May 2, 1995
INVENTOR(S) : Chapelle

It is certified that error appears in the above-indentified patent and that said Letters Patent is hereby corrected as shown below:

Title page, item [73], "Etablisse-" should read
--Etablissements--; 3rd line of Item 73, "Cedex" should read
--Clermont-Ferrand Cedex--; 2nd col., 5th line, "vol. 1, No. 38 (M-358) 1761)" should read --vol. 9, No. 38 (M-358) (1761)--
Col. 1, line 45, "extensible" should read --inextensible--.
Col. 3, line 41, "22°" should read -- -22°--.
Col. 4, line 62, "play" should read --ply--.

On drawing sheet, Fig. 2, the cross-hatching of the ply 22 should be omitted
between the vertical lines ℓ3/2 and ℓ2/2.

Signed and Sealed this

Tenth Day of October, 1995

*Attest:*

BRUCE LEHMAN

*Attesting Officer*         Commissioner of Patents and Trademarks